United States Patent [19]

Jacobson

[11] 4,213,010
[45] Jul. 15, 1980

[54] FAIL-SAFE MECHANISMS FOR A TELEPHONE ANSWERING DEVICE

[76] Inventor: Sava Jacobson, 8130 Orion St., Van Nuys, Calif. 91406

[21] Appl. No.: 925,370

[22] Filed: Jul. 17, 1978

[51] Int. Cl.$^2$ .............................................. H04M 1/65
[52] U.S. Cl. .................................................. 179/6 E
[58] Field of Search ............ 179/6 R, 6 E, 6 C, 6 AC

[56] References Cited

U.S. PATENT DOCUMENTS

| | | | |
|---|---|---|---|
| 3,383,469 | 5/1968 | Goodman | 179/6 E |
| 3,909,537 | 9/1975 | Jacobson | 179/6 R |
| 4,005,271 | 1/1977 | Urayama | 179/6 E |

*Primary Examiner*—Raymond F. Cardillo, Jr.
*Attorney, Agent, or Firm*—Spensley, Horn, Jubas & Lubitz

[57] ABSTRACT

The inventive control mechanisms are useful in a answering device in which previously recorded incoming messages can be played out via the telephone line under remote control. Remote playout is initiated upon receipt of a first beep tone transmitted by the user. Remote playout is terminated by receipt at a second such beep tone. In the event that the second beep tone is not received, a fail-safe mechanism, disclosed herein, modifies the ring response time of the ring detector so that a large number of rings, typically 20 to 25, are required to effectuate automatic answering. The average caller will hang up before this occurs. The user however, recognizing the situation, can allow the phone to ring enough times so that the device will answer, thereby enabling the user remotely to cause rewinding of the message tape and resetting of the device into the mode in which succeeding calls will be answered normally.

5 Claims, 6 Drawing Figures

FAIL-SAFE MECHANISMS FOR A TELEPHONE ANSWERING DEVICE

BACKGROUND OF THE INVENTION

1. Field of the Invention

The present invention relates to fail-safe and other control mechanisms for a remote controlled telephone answering device.

2. Description of the Prior Art

A particularly useful feature of some telephone answering devices is the ability of the user to have his messages played out automatically by remote control. Typically, when the user is away from his home or office and desires to hear his messages, he will call his own telephone number. When the device answers the telephone automatically, the user will transmit a beep tone via the telephone line which will cause the answering device to switch into a remote playout mode. The tape containing the recorded incoming messages is quickly rewound, and then set to the forward direction to play back the recorded messages via the telephone line. When all of the messages have been played out, the device is returned to the normal answering mode.

Various approaches have been used to control termination of the remote playout cycle. For example, in the apparatus of U.S. Pat. No. 3,067,289 to Zimmermann, an integrating timer is mechanically coupled to the incoming message recorder. This timer provides an index of the total elapsed recording time. When the tape is rewound in response to receipt of a remote control signal, the integrating timer retains its prior position. Then, as the recorded messages are played out to the user, a cam is mechanically advanced. When the message playout time equals the elapsed recording time stored by the integrating timer, the cam closes a microswitch to terminate the playout operation.

In a prior art system of the type just described, a complex mechanical arrangement is required to function as the integrating timer. Other prior art devices utilize different types of mechanical timers to control the playout duration of the recorded messages. Such techniques do accomplish the intended function, but require complex mechanical arrangements which add substantially to the cost of the device. Such methods are thus inapplicable to low cost telephone answering devices.

An alternative approach, not requiring an integrated timer, is to have the user terminate the playout cycle after he has heard all of the messages. This is accomplished by having the user send a second beep tone over the telephone line. The tone is detected by the device and used to terminate the playout operation. This technique can be implemented at low cost. Typical control circuitry for such a low cost, remote controlled telephone answering device is disclosed in the inventor's copending U.S. patent applications Ser. Nos. 897,279, filed Feb. 21, 1978 and 892,326, filed Mar. 31, 1978 now U.S. Pat. No. 4,126,763.

A problem may arise in the use of such a remote controlled telephone answering device in the event that the second beep control signal is not received. This may occur if the user forgets to send the second beep tone, or if for any reason the telephone connection is broken between the user and the answering device while the messages are being played out. Such an interrupted connection may occur if the user inadvertently hangs up before sending the second beep tone. It may also occur because of an inadvertent disconnect in the telephone transmission facilities.

If the second beep tone is not received, the telephone answering device will continue to run in the remote playout mode. The incoming message tape will continue to be wound onto the takeup reel. Previously recorded messages, if any, will continue to be transmitted to the telephone line, but of course will not be heard by the user if the circuit has been interrupted. Eventually, substantially all of the message tape will be wound onto the takeup reel.

Generally, a "fail-safe" circuit is provided to disable the telephone answering device when all of the message tape has been wound onto the takeup reel and no more is available for recording subsequent calls. This condition may occur normally if the maximum number of calls are received prior to the user playing back these messages, either under remote control or by using the built-in playback capability of the device. The condition also may occur as described above, in the event of remote controlled playback without receipt of the second beep control signal.

The "fail-safe" mechanism may take the form of a switch circuit which disables the telephone answering device and leaves the telephone line in an off-hook condition. As a result, a subsequent caller will get a busy signal. Of course, his call will not be answered. Alternatively, the mechanism may disconnect power from the answering device so that the caller hears a ring tone, but the call goes unanswered. Such "fail-safe" mechanisms present a serious disadvantage in a remote controlled playback system of the type described. If the "fail-safe" mechanism should be actuated as a result of non-receipt of the second beep control signal, the resultant answer disabling condition will totally prevent the user from subsequently remotely resetting the device to the normal answering mode. If the user again tries to call his own number, his call will not be answered. Thus the user will have to return to the physical location of the answering device and rewind the message tape under manual control. Obviously, this is a severe handicap for a user who plans to be away from his home or office for long periods of time.

A principal object of the present invention is to overcome this shortcoming of the prior art, and to provide a remote controlled telephone answering device which can be subsequently remotely actuated and returned to the normal answering mode even after all of the incoming message recording tape has been wound onto the takeup reel and the "fail-safe" circuit has been activated. To this end, the "fail-safe" circuit of the present invention does not cause an off-hook condition to occur, but rather modifies the ring response time of the ring detector so that a very large number of rings, typically 20 to 25, are required to effectuate automatic answering. A typically caller will hang up before this number of rings occurs. The user, however, recognizing the situation, can allow the requisite number of rings to occur so that his call will be answered. The user can then transmit beep control signals over the telephone line so as to cause rewinding of the incoming message tape and return of the device to the answer mode. This will condition the device to answer subsequent incoming calls in a normal manner. An additional object of the present invention is to provide appropriate control circuitry to accomplish such operation.

The electromechanical arrangements for accomplishing remote controlled rewind of the incoming message tape may be of the type disclosed in the above-identified co-pending applications of the inventor, or may be of the type disclosed in the inventors's U.S. Pat. No. 4,104,487, filed Dec. 13, 1976. However, it is another object of the present invention to provide yet a different type of cam-actuated mechanism for accomplishing such automatic rewind in a remote controlled telephone answering device. The inventive mechanism, in response to the receipt of a beep control signal, positions the tape drive motor into the rewind position so as to rewind the incoming message tape. The mechanism senses the completion of rewind, and thereafter returns the tape drive motor to the forward position so as to enable remote playout of the previously recorded messages. During the rewind operation, regulation of the voltage to the tape drive motor may be inhibited so that the motor will operate at maximum speed. In this regard, the present invention may be used in conjunction with the voltage regulator circuitry disclosed in the inventor's co-pending U.S. patent application Ser. No. 641,551, filed Dec. 17, 1975. Further to reduce the cost of the device, the present invention may be used in conjunction with an "all-plastic" type of construction such as that disclosed in the applicant's co-pending U.S. patent applications Ser. No. 766,898, filed Feb. 9, 1977 now U.S. Pat. No. 4,118,602 and 874,361, filed Feb. 2, 1978. However, the present invention may be used by itself or in conjunction with other telephone answering mechanisms, and need not necessarily be used with any of the circuits or devices disclosed in any of the inventor's other U.S. patent applications or patents identified hereinabove.

SUMMARY OF THE INVENTION

These and other objectives are achieved by providing novel fail-safe and other control mechanisms for a telephone answering device of the type in which remote controlled message playout is enabled by the receipt of beep control signals transmitted via the telephone line. In the disclosed fail-safe system, when substantially all of the incoming message recording tape has been wound onto the takeup reel, a switch circuit modifies the ring respose time of the ring detector. Thereafter, a large number of rings must occur before the call will be answered. In the event that this fail-safe condition occurred because of failure to receive the beep tone intended to terminate the remote playout operation, the user can still obtain access to the telephone answering device by calling his own number again, and allowing the requisite number of rings to occur. When his call then is answered, the user can remotely effectuate rewinding of the incoming message tape and resetting of the device to the normal answer mode.

Advantageously, this fail-safe mechanism includes a switch which is mechanically operated when substantially all of the tape is wound onto the takeup reel. Operation of the switch causes the insertion of a large-valued resistor into circuit with a capacitor that is charged by the detected ring voltage. The increased RC time constant thereafter causes the charging voltage on the capacitor to increase step-wise in small increments as each ring occurs. Only after a large number of rings have been received will the charge on the capacitor be sufficiently great so as to turn on a semiconductor switch that connects power to the answering device.

The remote controlled rewind mechanism disclosed herein includes a dual cam assembly which is driven by a cam drive motor that is turned on upon receipt of the first beep control signal. One portion of the cam cooperates with a follower arm to shift the tape drive motor to the rewind position. Another cam portion operates a switch which controls power to the cam drive motor and other necessary functions. When the end of rewind condition is detected, the cam drive motor advances the dual control cam to another position in which the tape drive motor is returned to the forward orientation. The dual cam assembly, cooperating with a single-pole, double-throw switch, results in a very simple control circuit.

BRIEF DESCRIPTION OF THE DRAWINGS

A detailed description of the invention will be made with reference to the accompanying drawings wherein like numerals designate corresponding elements in the several figures, which are not necessarily to scale.

FIG. 6 is an electrical schematic diagram showing the inventive fail-safe circuitry and showing the control circuit for the cam assembly of FIG. 3.

DESCRIPTION OF THE PREFERRED EMBODIMENT

The following detailed description is of the best presently contemplated mode of carrying out the invention This description is not to be taken in a limiting sense, but is made merely for the purpose of illustrating the general principles of the invention since the scope of the invention best is defined by the appended claims.

The inventive telephone answering device 10 (FIG. 1) is connected to a telephone 11, 12 (FIG. 6) via a balanced transformer 13, and functions automatically to answer calls received from that line. When a ring signal occurs, a ring detector 14 connects dc power from a supply 15 to the device 10. The power supply 15 itself is connected to the ac power via a pair of terminals 16a, 16b.

Figures 1, 4:
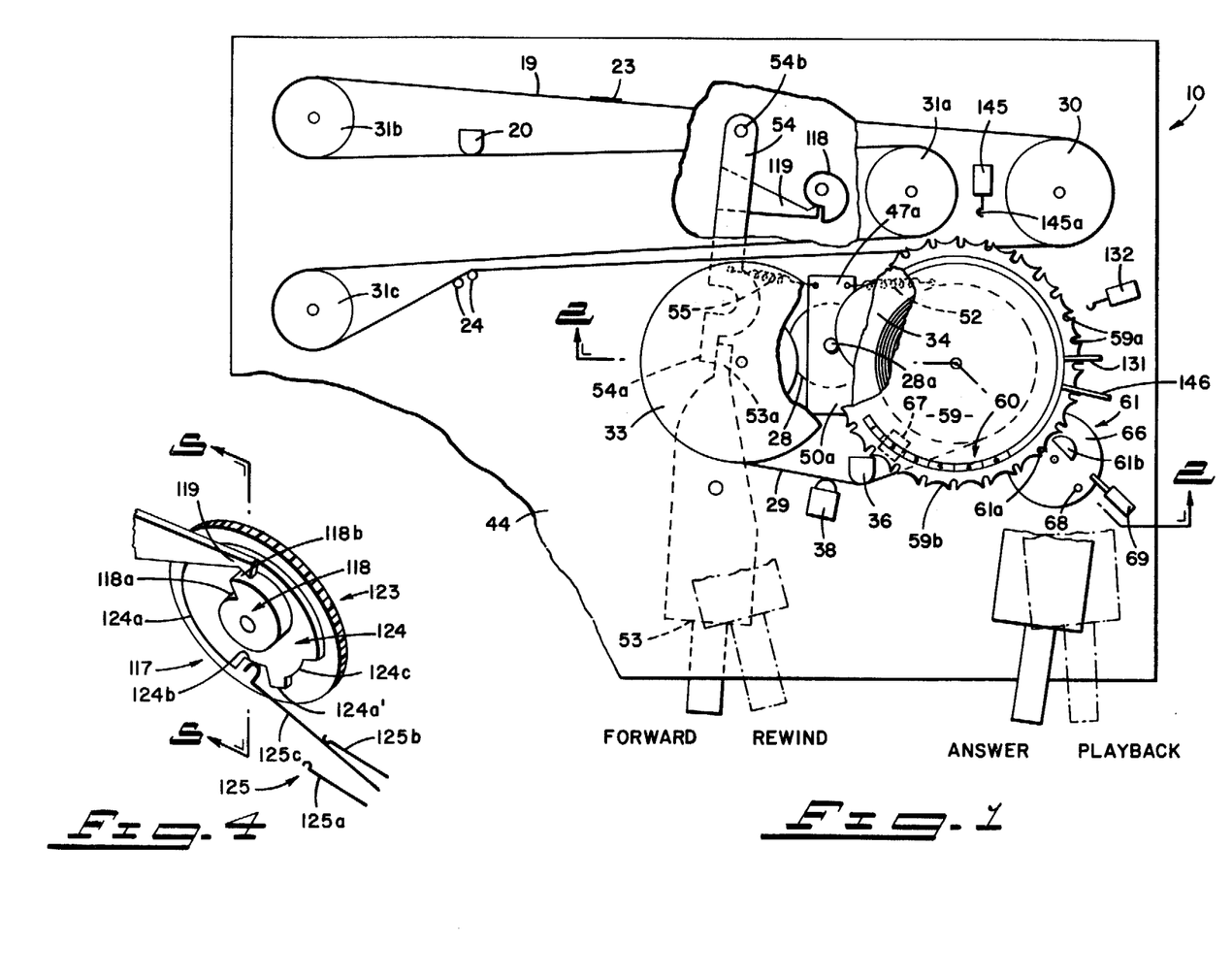
FIG. 1 is top plan view of a telephone answering device incorporating the inventive fail-safe and remote controlled playout mechanisms of the present invention.
FIG. 4 is a partial pictorial view like that of FIG. 3 but with the cam oriented so as to place the tape drive motor in the rewind position.

When power is thus applied at the beginning of the automatic answering cycle, a motor drive circuit 17 turns on a motor 18 which drives a tape loop 19 (FIG. 1). A prerecorded outgoing annoucement, typically indicating that the call is being answered automatically, is picked up from the tape loop 19 by a loop playback head 20. The announcement is transmitted to the telephone line via an outgoing amplifier (not shown), an audio line 21 (FIG. 6) and the balanced transformer 13.

Advantageously, the tape loop 19 includes an electrically conductive strip 23. After transmission of the complete outgoing announcement, the strip 23 electrically shorts a pair of contacts 24. This causes a mode control flip-flop (not shown) or other appropriate control circuitry to change state, thereby causing the motor drive circuit 17 to disable the loop motor 18 and to enable a reel drive motor 28 which drives a magnetic tape 29 on which messages incoming from the telephone line are recorded. The tape loop 19, which had been rotating about a drive pulley 30 and support pulleys 31a–31c, now remains stationary for the rest of the answering cycle. Although forming no part of the present invention, the motor drive circuit 17 and the mode control flip-flop referred to hereinabove may comprise circuitry such as that shown in the applicant's co-pending U.S. patent application Ser. No. 879,279.

Figure 2:
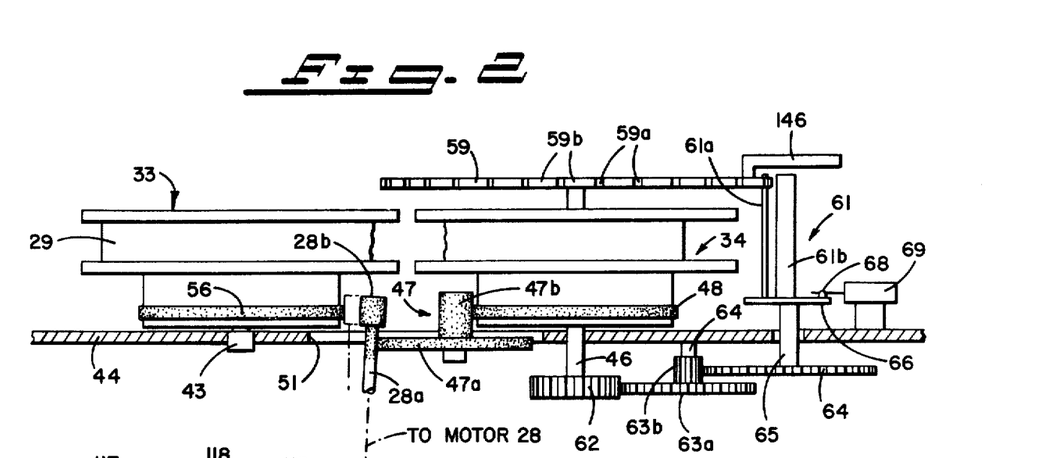
FIG. 2 is a side view of the incoming message tape drive assembly and of the message indicator wheel assembly, both as viewed on line 2—2 of FIG. 1.

As shown in FIGS. 1 and 2, the magnetic tape 29 is wound from a supply reel 33 onto a take-up reel 34. As the incoming message is received from the telephone line via the balanced transformer 13 and the audio line 21 (FIG. 6), it is amplified by an incoming amplifier (not shown) and recorded on the tape 29 via a reel record/playback head 36 (FIG. 1). At the same time, any material previously recorded on the tape 29 is erased by a reel erase head 38 (FIGS. 1 and 6) which is enabled during this operation by voltage supplied from the supply 15 via a line 39, a transistor 40 and a resistor 41. A capacitor 42 shunts the erase head 38.

Figures 3, 5:
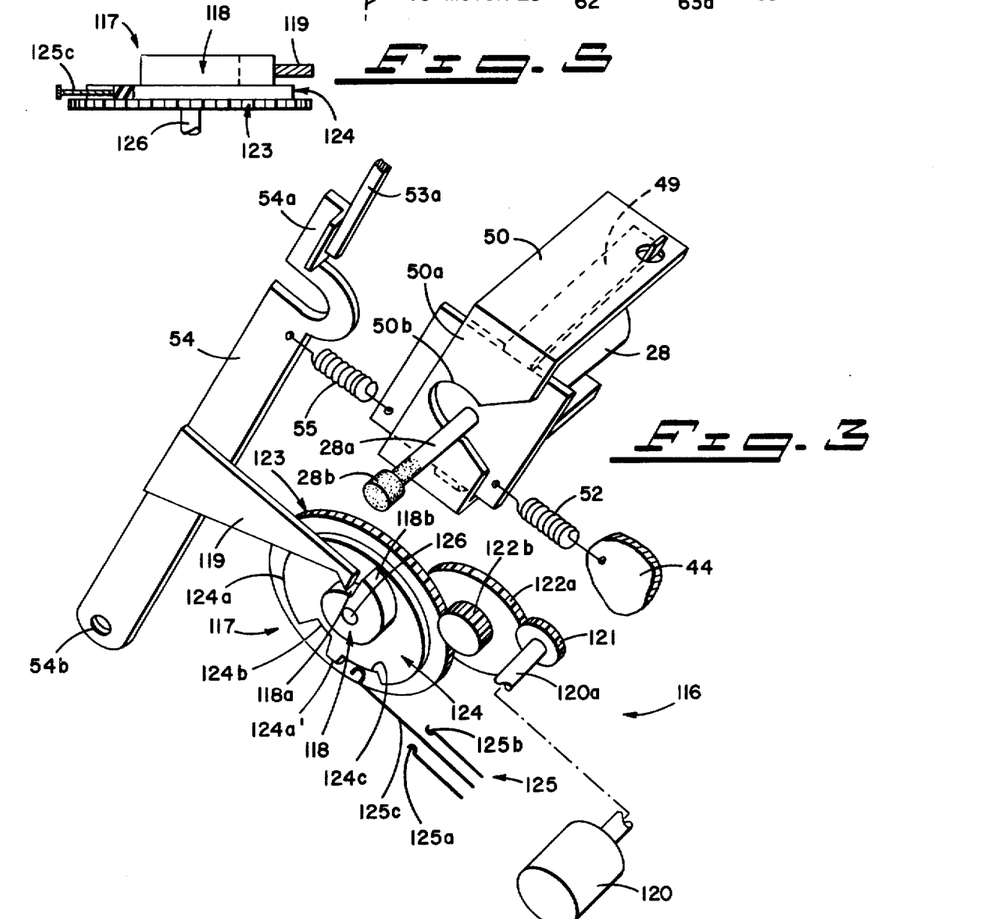
FIG. 3 is a pictorial view of the cam assembly used to tilt the incoming message tape drive motor from the forward to the reverse positions. The mechanism is shown "upside down", that is, as it would be seen when looking into the bottom of the telephone answering device of FIG. 1. In this view, the cam assembly is shown with the tape drive motor in the forward position.
FIG. 5 is a transverse sectional view of the dual cam, as viewed on the line 5—5 of FIG. 4.
Figure 3:
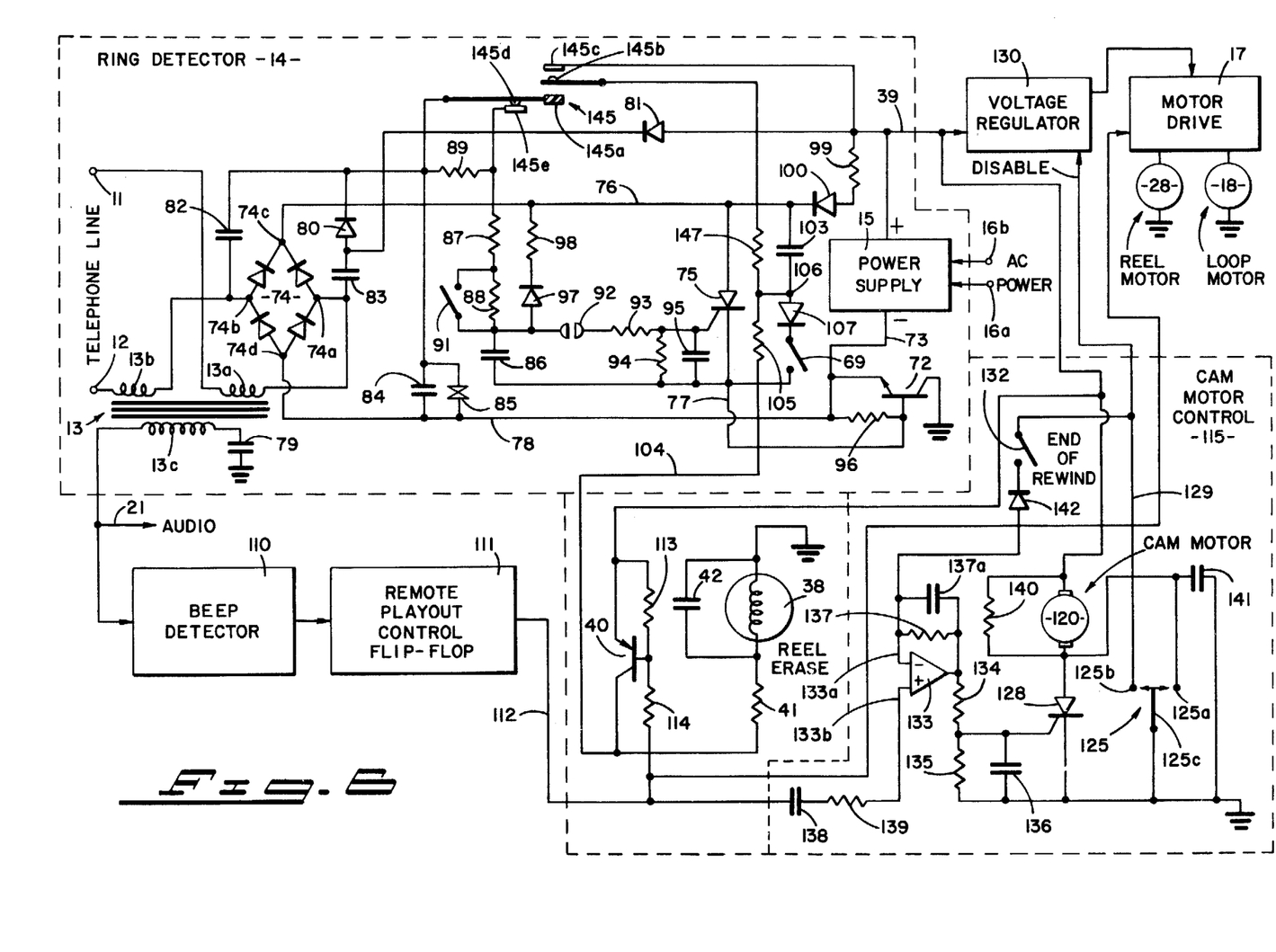

As seen in FIG. 3, the tape supply reel 33 is mounted to rotate about a shaft 43 which is bearing-mounted to extend vertically from a chassis or mounting plate 44. A friction plate (not shown) of felt of like material may be used to damp the free rotation of the reel 33, so as to prevent the tape 29 from spilling off the supply reel 33.

The take-up reel 34 is mounted to a shaft 46 which extends vertically through the chassis 44. The reel 34 is driven in the forward direction by the motor 28, the shaft 28a of which then engages the large diameter wheel 47a of an idler 47. A small diameter wheel 47b of the idler 47 in turn engages a friction disc 48 attached to the tape tape-up reel 34.

As best shown in FIG. 3, the tape drive motor 28 is attached to a U-shaped bracket 49 which itself is pivotally mounted within a U-shaped support bracket 50. The upper end 50a of the bracket 50 is affixed to the underside of the chassis 44. The shaft 28a of the motor 28 projects upwardly through an opening 50b in the support bracket 50 and through an opening 51 in the chassis 44. A relatively weak spring 52 (FIGS. 1 and 3), connected between the support bracket 49 and the chassis 44, pivotally biases the motor 28 and bracket 49 to the "forward" position shown in solid in FIG. 2.

To shift the drive mechanism manually to rewind, the device 10 is provided with a forward-rewind control arm 53 (FIG. 1) which is pivotally mounted to the chassis 44. The rear end 53a of this control arm abuts against, but is not connected to, the end 54a of a motor positioning lever 54 (FIGS. 1 and 3), the other end 54b of which is pivotally mounted to the chassis 44. Connected between the lever 54 and the motor support bracket 49 is a spring 55 which is relatively stronger than the spring 52. When the control arm 53 is moved to the rewind position shown in phantom in FIG. 1, the end 53a presses the lever 54 away from the motor mounting bracket 50. As this occurs, the stronger force of the spring 55 overcomes the bias of the weaker spring 52, thereby tilting the support bracket 49 and the motor 28 to the rewind position shown in phantom in FIG. 2. In this position, an enlarged, circular end 28b of the motor shaft 28 engages a friction disc 56 attached to the source reel 33. The motor 28 drives the source reel 33 in a direction that rewinds the magnetic tape 29. When the control arm 53 again is moved to the forward position, the force on the spring 55 is relieved, and the spring 52 once again tilts the motor 28 into the forward position, and returns the lever 54 to the position shown in FIG. 3.

An indicator wheel 59 (FIGS. 1 and 2) having a numbered scale 60 on its upper surface gives a visual indication of the total number of incoming messages that have been recorded since the tape 29 last was rewound.

A Geneva movement 61 advances the indicator wheel 59 by one count position each time an incoming message is recorded. To this end, as the reel 34 rotates counterclockwise to take up the tape 29 as a message is received, a gear 62, connected to the shaft 46, rotates in the same direction. This gear 62 drives a pair of gears 63a, 63b mounted on a shaft 64. The gear 63b in turn drives another gear 64 mounted on a shaft 65. The dimensions of the gears 62, 63a, 63b and 64 are selected so that the gear 64 will make one complete revolution in the time available to record an incoming message. A horizontal disc 66 is affixed to the shaft 65.

A vertical pin element 61a of the Geneva movement 61, mounted atop the disc 66, cooperates with a set of notches 59a at the periphery of the indicator wheel 59. Each time the gear 64 begins its single revolution as an incoming message is recorded, the pin 61a will engage a notch 59a and quickly rotate the indicator wheel 59 in a clockwise direction (FIG. 1) by one count position. For the remainder of the message recording time, as the gear 64 and disc 66 complete the single revolution, a crescent-shaped element 61b will engage a recess 59b in the indicator wheel 59 and prevent it from rotating further. As a result, the next subsequent numeral on the scale 60 will become visible beneath a window 67 (shown in phantom in FIG. 1) in the cover of the device 10 and will remain stationary until the next cover of the device 10 and will remain stationary until the next message is recorded.

Also affixed to the top of the disc 66 is a raised boss 68 which engages the arm of a "stop" switch 69. The switch 69 normally is open, but is closed when the boss 68 engages the switch arm. As described below, such closure terminates the answering cycle and causes dc power from the supply 15 to be disconnected from the motors and circuitry of the device 10. With this arrangement, the time duration of the incoming message record portion of the answering cycle is established by the rotation rate of the takeup reel 34 and the gear ratios of the gears 62, 63a, 63b and 64. Alternatively, the stop switch 69 may be positioned below the chassis 44 and operated by a boss extending from the gear 64.

Ring Detector Operation

The telephone link 11, 12 is connected to the ring detector 14 circuitry via separate primary windings 13a, 13b of the balanced transformer 13 (FIG. 6). When a ring signal is detected, a switch in the form of a transistor 72 is closed, so as to connect the negative line 73 from the power supply 15 to circuit ground. This turns on dc power to the various circuits of the device 10, and starts and the answering cycle.

The transformer input windings 13a, 13b are connected to a first pair of nodes 74a, 74b of a rectifier bridge 74. The other two bridge nodes 74c, 74d are effectively shorted together in response to ring detection when a silicon controlled rectifier (SCR) 75 begins conduction and turns on the transistor 72. This establishes a current path from the node 74c via a line 76, the SCR 75, a line 77, the base-to-emitter path of the transistor 72 and a line 78 to the node 74d. As a result, the primary windings 13a, 13b are effectively connected together in series across the telephone line when the transistor switch 72 is closed. This creates an effective "off-hook" condition and seizes the telephone line. The transformer secondary winding 13c and a capacitor 79 serve to couple both outgoing and incoming audio between the line 21 and the telephone line 11, 12.

Ring detection is accomplished by using a pair of diodes 80, 81 to rectify the ac ring signal which is coupled from the telephone line via a capacitor 82. The diodes 80, 81 together with a pair of capacitors 83, 84 are connected as a voltage doubler circuit. To make the ring response time substantially independent of the ring voltage, a Toshiba non-linear resistor or symmetrical Zener diode 85 is connected across the capacitor 84. This device 85, like a conventional Zener diode, has a fixed breakdown voltage, and thus establishes a corresponding fixed voltage across the capacitor 84. For example, if the device 85 has a breakdown voltage of 95 volts, this will be the voltage developed across the capacitor 84 by the voltage doubler circuit for ring voltages having any value above about 50 volts.

The actual ring response time is established by the RC time constant of a capacitor 86 and its associated resistor 87, 88, and 89. The resistor 89 normally is shorted out, but as described below in connection with the "fail-safe" mechanism, is inserted into circuit with the capacitor 86 when a switch 145 is actuated.

The value of the resistor 87 is selected so that when it alone is in circuit with the capacitor 86, the ring detector 14 will turn on during the first ring. This immediate response is conditioned by closing a switch 91 to short out the resistor 88. The value of the resistor 88 is chosen so that when the switch 91 is opened, the combined resistance of the resistors 87 and 88 will result in a response time on the order of four or five rings. Thus the switch 91 serves the purpose of permitting the user to adjust the number of rings to be heard by the caller before his call is answered.

After occurrence of sufficient ring signals, the capacitor 86 will be charged to a level which is sufficient to fire a neon bulb 92. When this occurs, current will flow through a pair of resistors 93, 94, thereby supplying a gate signal which turns on the SCR 75. This in turn causes the transistor 72 to conduct, thereby connecting the power supply 15 to system ground so as to connect power to the other answering device components.

A capacitor 95 shunts the resistor 94, and a resistor 96 shunts the base-to-emitter path of the transistor 72. A diode 97 and a resistor 98 provide a discharge path for the capacitor 86 through the SCR 75 to ensure complete discharge of the capacitor 86 after the neon bulb 92 is fired. A resistor 99 and a diode 100 provide sufficient current to hold the SCR 75 in the conducting state in the event that bias from the telephone line 12 is interrupted during the answering operation.

As noted above, the answering cycle normally is terminated by closure of a switch 69 at the end of recording of an incoming message. To accomplish this, a capacitor 103 is charged during the answering cycle. The charging path is from the positive voltage line 39 via the transistor 40, a line 104, a resistor 105, a line 106 and the capacitor 103 to the line 76. When the SCR 75 is conducting, there is a potential difference between the line 76 and the positive voltage line 39 which is sufficient to charge the capacitor 103. The polarity of the capacitor 103 at the line 106 will be positive with respect to the line 76. At the end of the answering cycle, when the stop switch 69 is closed, the capacitor 103 will be connected across the SCR 75 via a diode 107. The capacitor 103 then will discharge through the SCR 75 with the correct polarity to turn off that SCR. This causes the transistor switch 72 to open, disconnecting power from the device 10, and removing the load from the telephone line. These actions accomplish termination of the normal answering cycle.

Remote Playout Control

To accomplish remote controlled playback of recorded incoming messages, the user calls his own number from a remote telephone. The ring detector 14 answers the call in the manner described above. At the appropriate time, for example, during transmission of the outgoing announcement, the user sends a beep tone via the telephone line. This may be generated e.g., by an audio oscillator mounted in a small housing which the user holds against the telephone mouthpiece.

In the device 10, the received beep tone is coupled via the transformer secondary 13c and the line 21 to a beep detector 110 (FIG. 6) which advantageously has a very narrow bandpass filter that is responsive only to the tone of the user's audio oscillator. Detection of the beep tone causes a remote playout control flip-flop 111 to switch from its normal first state in which a low output signal is provided on a line 112 to a second, "remote enable" state in which the signal on the line 112 is high. This high signal (a) causes the motor drive circuit 17 to turn off the loop motor 18 and turn on the reel motor 28, (b) turns off the transistor 40 via a pair of resistors 113, 114, thereby disabling the reel erase head 38 and disabling device 10 turn-off by the stop switch 69, and (c) actuates a cam motor control circuit 115 which, in conjunction with the mechanism shown in FIG. 3, causes rapid rewinding of the incoming message tape 29 and conditioning of this tape for playout of the previously recorded messages.

To accomplish remote controlled rewind, a mechanism 116 (FIG. 3) includes a cam 117 that cooperates with the motor positioning lever 54 to tilt the motor 28 from its normal forward position to the rewind position. To this end, the cam 117 includes a first section 118 having a cam surface the radius of which progressively increases from a region 118a of minimum radius to a region 118b of maximum radius. The cam section 118 is engaged by a follower arm 119 that is attached to the motor positioning lever 54.

The cam 117 is rotated (in a clockwise direction as viewed in FIG. 3), by a cam drive motor 120. A set of gears 121, 122a and 122b interconnect the shaft 120a of the motor 120 to a gear section 123 of the cam 117. The motor 120 is controlled by the circuit 115 of FIG. 6. The cam 117 further includes a second section 124 which controls a switch 125 that is part of the control circuit 115. As best seen in FIG. 5, the cam sections 123, 124 and 118 form a three-layered cam structure 117 having a shaft 126 that is rotatably mounted to the chassis 44.

When the first beep tone is received, the resultant positive-going signal from the remote playout control flip-flop 111 (FIG. 6) triggers on a silicon controlled rectifier (SCR) 129 that connects power to the motor 120. The motor 120 then drives the cam 117 clockwise (as viewed in FIG. 3) so as to rotate the follower arm 119 and the motor positioning lever 54 in a direction that pulls the motor 28 into the rewind position. As the cam 117 is turning, a maximum radius sector 125a of the cam section 124 presses the arm 125c of the switch 125 into electrical connection with a switch contact 125a. As seen in FIG. 6, this circuit closure shorts out, and therefore turns off, the SCR 129. However, power continues to be supplied to the cam motor 120 via the closed circuit of the switch 125 including the contact 125a and the arm 125c.

The cam motor 120 continues to rotate the cam 117 until the support bracket 49 and the tape drive motor 28 have been tilted to the rewind position (shown in phantom in FIG. 2). In this position, the cam 117 and the follower arm 119 have the orientation shown in FIG. 5. When this cam 117 orientation is reached, the switch arm 125c, which advantageously is made of a resilient material that biases the arm toward the cam section 124, drops into a minimum-radius sector 124b. As a result, the switch circuit including the contact 125a is opened, thereby disconnecting power from the cam motor 120 and terminating the rotation of the cam 117. The tape reel drive motor 28 remains in the rewind position.

Closure of the switch 125 circuit through the contact 125b connects a line 129 to ground. This line 129 is connected to the "disable" control input of a voltage regulator 130 which normally is used to regulate the voltage from the power supply 15 and to supply this regulated power to the loop motor 18 and the reel motor 28 via the motor drive circuit 17. Such motor voltage regulation ensures constant loop and tape speed so as to minimize audio distortion. However, during automatic rewind, when the line 129 is grounded via the switch 125, the voltage regulator 130 is disabled, so that unregulated, maximum voltage is supplied to the tape reel drive motor 28. As a result, the motor 28 runs at maximum speed, thereby minimizing the time required to rewind the message tape 29.

As the tape 29 is rewound, the message indicator disc 59 (FIGS. 1 and 2) will counter-rotate (i.e., move in a counter-clockwise direction as viewed in FIG. 1). When all of the tape 29 has been rewound, an arm 131 (FIG. 1) attached to the indicator disc 59 will actuate an "end of rewind" switch 132. Closure of the switch 132 will again trigger on the SCR 129, thereby again supplying power to the cam motor 120.

The motor 120 now begins to rotate the cam 117 in the same direction as before (i.e., clockwise as viewed in FIGS. 3 and 4). As this cam 117 rotation begins, the switch arm 125c rides up onto a maximum radius cam section 124a'. This opens the switch circuit through the contact 125b and closes the circuit through the contact 125a. The SCR 129 thereby is shorted, and turned off, but power continues to be supplied to the cam motor 120 via the switch 125.

As the cam 117 rotates through a small angle, the follower arm 119 will drop off the end of the maximum radius cam region 118b, and fall onto the minimum radius region 118a. As this occurs, the force exerted on the spring 55 by the lever 54 is relieved. The spring 52 thereby pulls the support bracket 49 and the reel motor 28 into the forward position. The resultant force on the spring 55 biases the motor positioning lever 54 and the followr arm 119 against the minimum radius cam region 118a. In this manner, the tape drive mechanism is quickly turned to the forward mode (at the end of automatic rewind), with only slight angular rotation of the cam assembly 116.

With the cam assembly 116 returned to the forward position shown in FIG. 3, the switch arm 125c rests in a medium radius section 124c and no longer is in electrical circuit with either contact 125a, 125b. As a result, the line 129 no longer is grounded, and the voltage regulator 130 is enabled so as to provide regulated voltage to the reel motor 28. The motor 28 thus drives the tape 29 in the forward direction with a constant motor speed, thereby facilitating remote playout of the previously recorded messages with minimum audio distortion. The messages are transmitted to the user over the telephone line via the tape pickup head 36, an amplifier (not shown), the audio line 21 and the transformer 13.

An operational amplifier 133 (FIG. 6) is used to provide the trigger signals for the SCR 128. The output terminal of the amplifier 133 is connected to the gate of the SCR 128 via a voltage divider consisting of a pair of resistors 134, 135 and a capacitor 136. A feedback resistor 137, shunted by a capacitor 137a, is connected between the amplifier 133 output terminal and the inverting (−) input terminal 133a. With this feedback arrangement, the amplifier 133 output normally is held at a low level.

Upon receipt of the initial beep tone, the signal on the line 112 goes high. The positive-going transient is fed via a capacitor 138 and a resistor 139 to the non-inverting (+) input 133b of the amplifier 133. This input pulse causes the output of the amplifier 133 briefly to be driven positive, thereby providing the requisite trigger pulse to the SCR 128. As described above, this initially connects power to the cam motor 120. A resistor 140 connected across the motor 120 ensures continued current flow through the SCR 128 even in the event of momentary open circuits through the brushes of the motor 120.

As described above, the switch arm 125c closes a circuit through the switch contact 125a that continues to provide power to the cam motor 120 during the rotation of the cam 117. A capacitor 141 shunts the switch 125 and provides arc suppression when the switch arm 125c is disconnected from the contact 125a each time that the cam 117 stops.

During the transition from the rewind position (FIG. 4) to the forward position (FIG. 3) the line 129 (FIG. 6) is grounded through the switch 125. The output of the amplifier 133 is held low by the feedback operation of the resistor 137. When the "end of rewind" switch 132 is closed, the inverting (−) input 133a of the amplifier 133 is connected to ground via a diode 142. By using an operational amplifier, such as a type LM 3900, in which the inverting input is self biased above ground (typically to about 0.5 volts), grounding of the inverting input causes the amplifier 133 output to go positive. As a result, a trigger signal is supplied to the SCR 128. This initiates the return of the reel drive motor 28 to the forward position. As this occurs, the circuit through the switch contact 125b is opened so that the amplifier input 133a no longer is grounded. The resultant feedback through the resistor 137 returns the output of the amplifier 133 to a low level.

The silicon controlled rectifier 128 may be replaced with another type of bistable switching device that is operative to supply power to the cam motor 120 when triggered to a first state by the signal from the amplifier 133. The switch 125 circuit including the contact 125a then may be used to reset the switching device to the alternate state.

As previously recorded messages are being played out, the indicator wheel drive disc 66 will make one complete revolution for each message that is played out. At each such turn, the "stop" switch 69 will be closed. However, during remote playback this closure will not turn off the device 10, since as described above, the capacitor 103 is not charged. This condition results since the high signal on the line 112 holds the transistor 40 off and causes the voltage on the line 104 to be low. Thus even though the switch 69 is closed, the absence of charge on the capacitor 103 means that there is no voltage available to turn off the SCR 75. Thus message playout can proceed without turn-off of the device 10.

Fail-Safe Mechanism

In a telephone answering device of the type described, remote controlled playout is terminated when the user transmits a second beep tone. When this tone is received, the resultant signal from the beep detector 110 causes the flip-flop 111 to return to the "normal answering" mode in which the signal on the line 112 is low. When this occurs, the motor drive circuit 17 disables the tape reel drive motor 28 and again supplies power to the loop motor 18. The answering device 10 then continues the automatic answering operation which was interrupted when the device was switched to the remote playout mode upon receipt of the first beep tone. In this continued operation, the device 10 completes transmission of the outgoing announcement, switches to the incoming message record mode, and goes through a normal incoming message recording cycle. At the end of that cycle, the boss 68 (FIG. 1) closes the "stop" switch 69. This results in device turn-off, since when the unit went back to normal answering operation, the low signal on the line 112 again turned on the transistor 40 thereby providing voltage to charge up the capacitor 103. Closure of the switch 69 thus results in discharge of the capacitor 103 across the SCR 75 with concomitant turn-off of the device 10.

With such a system, a user hazard exists in the event that the second beep tone is not received by the device 10. This would happen e.g., if the telephone connection were interrupted while the user were listening to the playout of the previously recorded messages. It would also occur if the user forgets to transmit the second beep tone before hanging up. In either case, the device 10 would remain in the automatic playout mode, with the reel motor 28 driving the tape 29 onto the take-up reel 34.

In this undesirable situation, the answering device 10 would not switch back to the normal answering mode, and would not be turned off when the "stop" switch 69 is closed. In accordance with the present invention, the situation is ameliorated by the use of a fail-safe mechanism including a fail-safe switch 145 (FIGS. 1 and 6) that is operated by an arm 146 (FIGS. 1 and 2) attached to the indicator disc 59.

Under the circumstances just described, when no second beep tone is detected, the reel motor 28 eventually will drive substantially all of the tape 29 onto the reel 34. When that happens, the indicator disc 59 will have rotated so far (in the clockwise direction as viewed in FIG. 1) that the arm 146 will actuate the fail-safe switch 145. This causes two things to occur. First, the "stop" switch 69 will be enabled to turn off the device 10 the next time that it is closed. Secondly, the ring response time of the ring detector 14 will be altered so that a very large number of rings, typically 20 to 25, will be required to answer a call. Although most callers will hang up before this number of rings has occurred, the user can obtain access to the device 10 by allowing this many rings to occur. When access is obtained, a new remote playout cycle can be initiated, during which the tape 29 can be rewound under remote control, and the device 10 can be switched back to the normal answering mode by transmission of a second beep tone.

To accomplish these functions, the switch 145 has two sections which are actuated concurrently when the arm 146 engages the switch arm 145a. The first section comprises a normally open pair of contacts 145b, 145c which are closed by the arm 145a to connect a positive dc charging voltage from the line 39 via a resistor 147 to the capacitor 103. With this arrangement, the next time that the switch 69 is closed, positive voltage will be supplied from the charged capacitor 103 via the diode 107 and the closed switch 69 to the cathode of the SCR 75. As a result, the SCR 75 will turn off, thereby turning off the device 10.

The second section of the switch 145 consists of a normally closed pair of contacts 145d and 145e. The resistor 89 normally is shorted out by these closed contacts. When the switch 145 is operated, the contacts 145d, 145e open, thereby inserting the resistor 89 in series with the resistors 87 and 88 and the capacitor 86 which determine the ring response time of the ring detector 14. The value of the resistor 89 is selected so that it will take a relatively large number, typically 20 to 25, or rings to charge the capacitor 86 to a level sufficient to fire the neon bulb 92 and thereby turn on the device 10.

When the fail-safe 145 has been actuated, the user can obtain access to his telephone device by dialing his own number and letting the requisite number of rings occur. Preferably, the remote playout control flip-flop 111 is conditioned to the normal answering mode each time that power from the supply 15 is connected to the device 10 in response to ring detection. Thus when the device 10 "answers" the user's call in response to detection of the requisite large number of rings, the flip-flop 111 will be set to the "normal answering" state. The user can then transmit a first beep tone which will cause the device 10 to switch to the automatic playout mode. The cam motor control 115 and cam assembly 116 will operate as described above to accomplish rewind of the message tape 29.

At any time after completion of rewind, the user can transmit a second beep tone which will properly return the device 10 to the normal answering mode. If the user has already heard all of his incoming messages, the second beep can be transmitted immediately after the automatic rewind has been completed, so that substantially the entire reel of tape 29 will be available to record subsequent incoming messages. Alternatively, the user can delay transmission of the second beep tone until he has heard all of the previously recorded incoming messages. The beep tone can be transmitted then, resetting the device into the answering mode, while leaving all of the previously recorded messages still on the tape 29. This may be advantageous in the event that the user wishes to hear the messages again at some later time. It also allows the user to hear messages which he did not hear before, because they were transmitted after an interruption of the telephone connection (during the previous remote controlled operation) which resulted in actuation of the fail-safe mechanism.

In the event that an incoming call should arrive after the fail-safe switch 145 has been actuated, the device 10 will only answer the call if the requisite large number of rings should occur. What is more likely, however, is that the caller will hang up after five or six rings have occurred, but no answering has taken place. If a number of such calls should occur, the capacitor 86 may be charged up to the requisite device turn-on level as a result of the combined charging operations during several of the incoming but unanswered calls. For example, if five such incoming calls should occur in a reasonably short time span, during each of which the caller allows five rings to occur, the capacitor 86 will be charged to a level equivalent to 25 rings when the fifth call occurs. At that time, the charge will be sufficient to fire the neon bulb 92 and turn on the device 10. Thus, this fifth call will in fact be answered. To accommodate this situation, it is desirable to situate the fail-safe actuating arm 146 so as to operate the switch 145 before all of the tape 29 has been wound onto the take-up reel 34. For example, the arm 146 may be positioned so that when fail-safe operation occurs there is still sufficient tape left on the source reel 33 to record say five additional incoming messages. With this arrangement, the device 10 will still be able to record the incoming message of a call that is answered under the condition just described where several successive incoming calls eventually charge the capacitor 86 to a level at which answering occurs).

Advantageously, the switch 145 is of the type in which the arm 145a will be transferred to the operated state when the control arm 146 passes the switch 145 in a first direction (i.e., clockwise as viewed in FIG. 1) and will remain in this condition until reset to the unactuated state by the return of the arm 146 past the switch arm 145a in the reverse (i.e., counterclockwise) direction. This arrangement also is desirable to ensure that the reel motor 28 will continue to rotate the reel 34, the gears 62–64 and the disc 66 for a sufficient time after actuation of the switch 145 to ensure closure of the "stop" switch 69 and concomitant turn-off of the device 10.

Although not so limited, the beep detector 110, the remote playout control flip-flop 111 and the motor drive circuit 17 may be of the type disclosed in the inventor's co-pending U.S. patent application Ser. No. 879,279 described hereinabove. Alternatively, the present invention may be used in conjunction with other telephone answering devices having beep-tone actuated, remote controlled playout capability.

In the answering device described above, remote playout is enabled and terminated by the receipt of first and second beep tones. However, the present invention is not limited to such beep tone actuation, but will operate with answering devices in which remote playout is conditioned by the receipt of any type of coded signal (of which a beep tone is exemplary). In such instance, the beep detector 110 (FIG. 6) would be replaced by an appropriate detector circuit which is responsive to the particular encoded signal that is employed.

I claim:

1. In a telephone answering device having a ring detector, recording means for recording incoming messages on a tape, and message indicator means advanced as said tape is wound onto a takeup reel, the length of said tape being sufficient to record a certain number of such messages, which device having remote controlled playback capability actuated by receipt of a coded signal transmitted via the telephone line and terminated by receipt of a second such coded signal, said device having turn-off means, activated each time said recording means has run for a duration of time corresponding to the time for recording a single incoming message, for turning off said device and thereby terminating the answering cycle, actuation of remote controlled playback disabling said turn-off means so that said device will not be turned off each time said recording means has run for said corresponding time duration while remotely playing out previously recorded incoming messages, the improvement comprising:

a "fail-safe" switch operated when said indicator means indicates that said sufficient length of tape has been wound onto said takeup reel, first circuit means, cooperating with said "fail-safe" switch, for modifying the ring response time of said ring detector upon operation of said "fail-safe" switch so that receipt of a large number of ring signals is required to cause said ring detector to effectuate answering by said device, whereby said device will not answer an incoming call for which the caller hangs up before occurrence of said large number of rings, but will answer a call in which the caller allows more than said large number of rings to occur, such answering thereby enabling said caller again to actuate remote controlled playback with concomitant rewinding of the incoming message tape and resetting of the device normally to answer subsequent incoming calls, and second circuit means, responsive to operation of said "fail-safe" switch, for enabling said turn-off means to turn off said device when next activated by said recording means, thereby ensuring turn-off of said device even in the event that remote controlled playout is not terminated because the second coded signal is not received.

2. The improvement of claim 1 wherein said message indicator means includes a message counter wheel driven in unison with said takeup reel, said device also having:

means for operating said "fail-safe" switch when said counter wheel has been driven to a setting corresponding to one which indicates that said certain number of messages has been recorded.

3. The improvement of claim 1 wherein said ring detector includes a silicon controlled rectifier that is turned on upon ring detection to begin an answering cycle, said turn-off means comprising:

a capacitor that is charged during the normal answering cycle, a "stop" switch operated by said recording means and connected between said capacitor and said silicon controlled rectifier, closure of said "stop" switch applying the charge of said capacitor across said silicon controlled rectifier with the correct polarity to turn said silicon controlled rectifier off, the charging of said capacitor being inhibited during remote controlled playback to disable device turn-off, said second circuit means including a section of said "fail-safe" switch which is closed when said "fail-safe" switch is operated, said switch section being connected so that when closed, voltage will be provided via said second circuit means to charge said capacitor, whereby at the next operation of said "stop" switch the charge on said capacitor will be applied across said silicon controlled rectifier to turn that rectifier off.

4. The improvement of claim 1 wherein said recording means includes an actuating member positioned to actuate said "fail-safe" switch when said sufficient length of tape has been wound onto a takeup reel, the actual length of said tape being greater than said sufficient length, so that extra tape is available subsequent to actuation of said "fail-safe" switch to record at least one additional incoming message.

5. The improvement of claim 1 wherein said coded signal is a beep tone.

* * * * *